Aug. 7, 1945.    J. H. WALTHALL    2,381,477
PRODUCTION OF ALUMINA
Filed May 21, 1942    4 Sheets-Sheet 2

John H. Walthall
INVENTOR
BY Arthur L. Davis
ATTORNEY

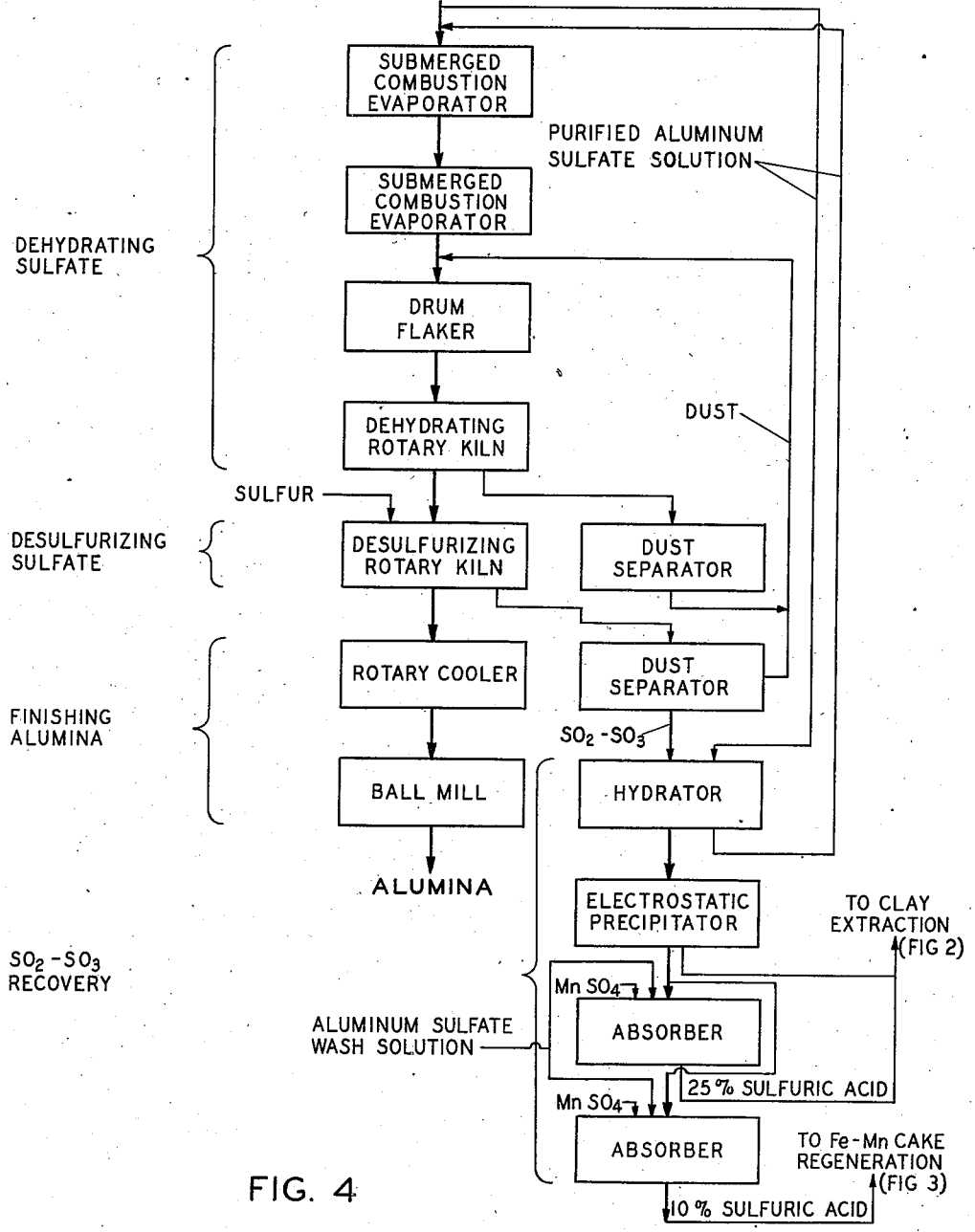

Patented Aug. 7, 1945

2,381,477

UNITED STATES PATENT OFFICE 2,381,477

PRODUCTION OF ALUMINA

John H. Walthall, near Sheffield, Ala., assignor to Tennessee Valley Authority, a corporation of the United States of America Application May 21, 1942, Serial No. 443,940

5 Claims. (Cl. 23—141)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of producing alumina from siliceous, aluminiferous material, and particularly involves the extraction of such material by an acid process.

It is well recognized that the aluminum ore, bauxite, containing 50 to 60 per cent of alumina and a very small proportion of silica, may have the alumina extracted therefrom more economically by the use of alkaline processes than by the use of the acid processes. The supply of such high-alumina-content ore is relatively limited, and this makes it necessary to consider the extraction of alumina from materials containing 10 to 40 per cent aluminum oxide, which can be found in great abundance the world around, but which, generally, have a high silica content and are most likely to have a relatively low iron content. The presence of these undesirable constituents of low-alumina-content material, particularly the silica, mitigates against the use of alkaline processes. Nevertheless, acid processes for the extraction of alumina from siliceous, aluminiferous material are recognized to have certain disadvantages, which include the production of dilute impure aluminum sulfate solution from which it is difficult to remove the iron impurity, the concentration of a corrosive, dilute purified aluminum sulfate solution and effective recovery of oxides of sulfur resulting from the desulfurization of the aluminum sulfate.

The principal object of this invention is to provide a method for the extraction of alumina of high purity from relatively low-grade siliceous aluminiferous material. Another object of this invention is to provide a cyclic process for the extraction of alumina from siliceous aluminiferous material wherein impurities such as silicon and iron are maintained in a minimum amount in the solutions in which they occur and finally substantally completely removed from such solutions. A further object of this invention is to provide a cyclic method for the extraction of alumina from siliceous aluminiferous material wherein the oxides of sulfur are effectively recovered and further utilized in the process. Still another object of this invention is to provide a cyclic process for the production of alumina from siliceous aluminiferous material wherein the removal of iron from the solutions in which it occurs, together with the regeneration of the reagents involved is carried out in an effective manner. Other objects of this invention include the provision for a method for the production of a high purity alumina suitable for the electrolytic production of aluminum from plentiful relatively low-grade siliceous aluminiferous ores in an efficient and economic manner. Another object of this invention is the production of alumina having desirable physical characteristics in the form of sized material, with a minimum of fines, which has a low apparent density.

The present invention is directed to the cyclic process for the production of alumina, sufficiently free from silicon and iron to be suitable for the electrolytic production of aluminum, from siliceous aluminiferous material by intimately mixing a stream of the dehydrated material and a stream of aqueous sulfuric acid derived at least in part from operation of a subsequent step of the process defined herein, and containing small proportions of aluminum sulfate and manganese sulfate at a temperature and for a time sufficient to extract substantially all of the aluminum from said material and form a mixture of dissolved aluminum sulfate substantially free from dissolved silica and a siliceous residue; by separating the impure aluminum sulfate solution so formed from said siliceous residue; by treating said impure aluminum sulfate solution with an oxidizing agent to oxidize constituents therein and with manganous acid derived in part from the manganese sulfate therein, and derived in part from the operation of a subsequent step of the process defined herein, and therewith precipitate the iron therein as iron-manganese complex; by separating the aluminum sulfate solution so purified from said iron-manganese complex; by washing said iron-manganese complex with water to produce a more dilute aqueous solution of aluminum sulfate substantially free from iron; by dehydrating and desulfurizing a portion of said purified aluminum sulfate solution to produce alumina and oxides of sulfur; by contacting said oxides of sulfur with another portion of said purified aluminum sulfate solution to evaporate water therefrom and absorb at least some of the oxides of sulfur therein; by returning the resulting solution after such contact to the supply of purified aluminum sulfate solution for dehydration and desulfurization; by absorbing a substantial portion of the remainder of said oxides of sulfur in said more dilute aluminum sulfate solution in the presence of a small proportion of manganese sulfate to produce sulfuric acid containing a small proportion of aluminum sulfate and manganese sulfate; and by treating said iron-manganese complex with acid derived at least in part from the oxides of sulfur produced in operation of a preceding step of the process defined herein to remove iron therefrom and regenerate manganous acid.

In the accompanying drawings, which form a part of the specification,

Fig. 4 is a flow sheet showing the details of dehydrating the purified aluminum sulfate solution, desulfurizing the dehydrated aluminum sulfate, finishing of alumina produced by desulfurization and recovery of oxides of sulfur, as outlined in Fig. 1.

Figure 1:
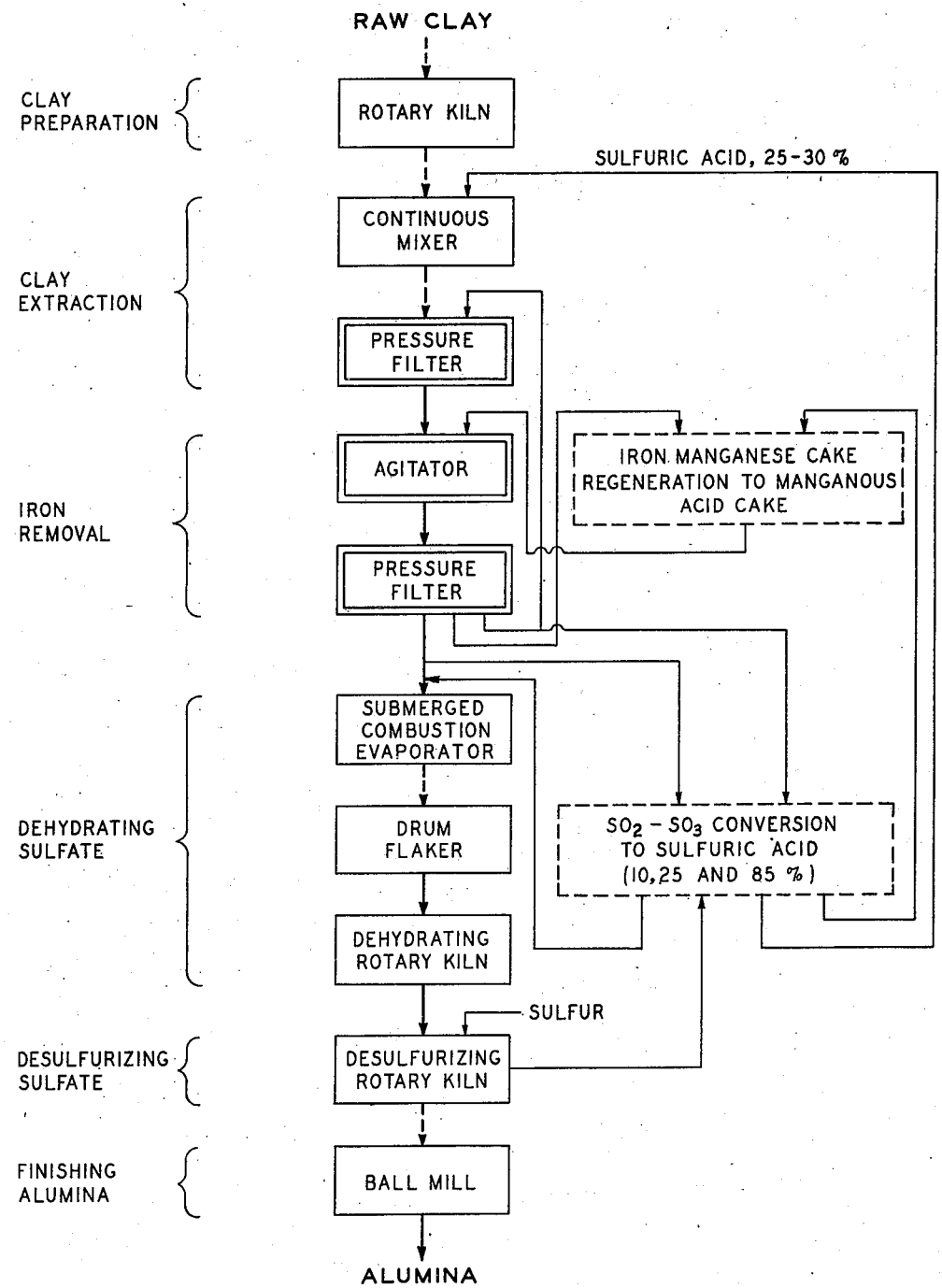
Fig. 1 is a flow sheet which outlines one embodiment of the present invention.
Figure 2:
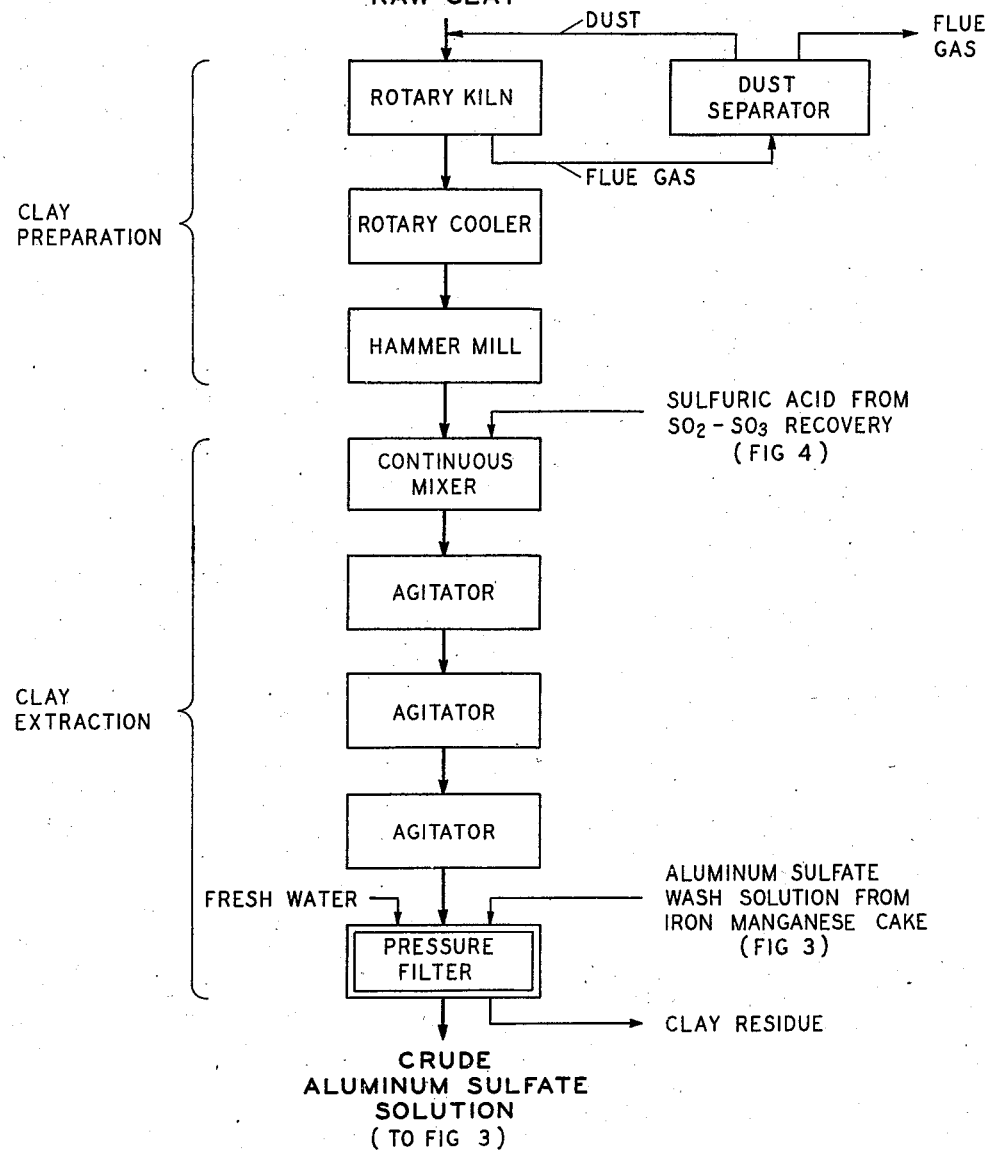
Fig. 2 is a flow sheet showing the details for the preparation of aluminiferous material and the acid extraction of said material to form an impure aluminum sulfate solution, as outlined in Fig. 1.
Figure 3:
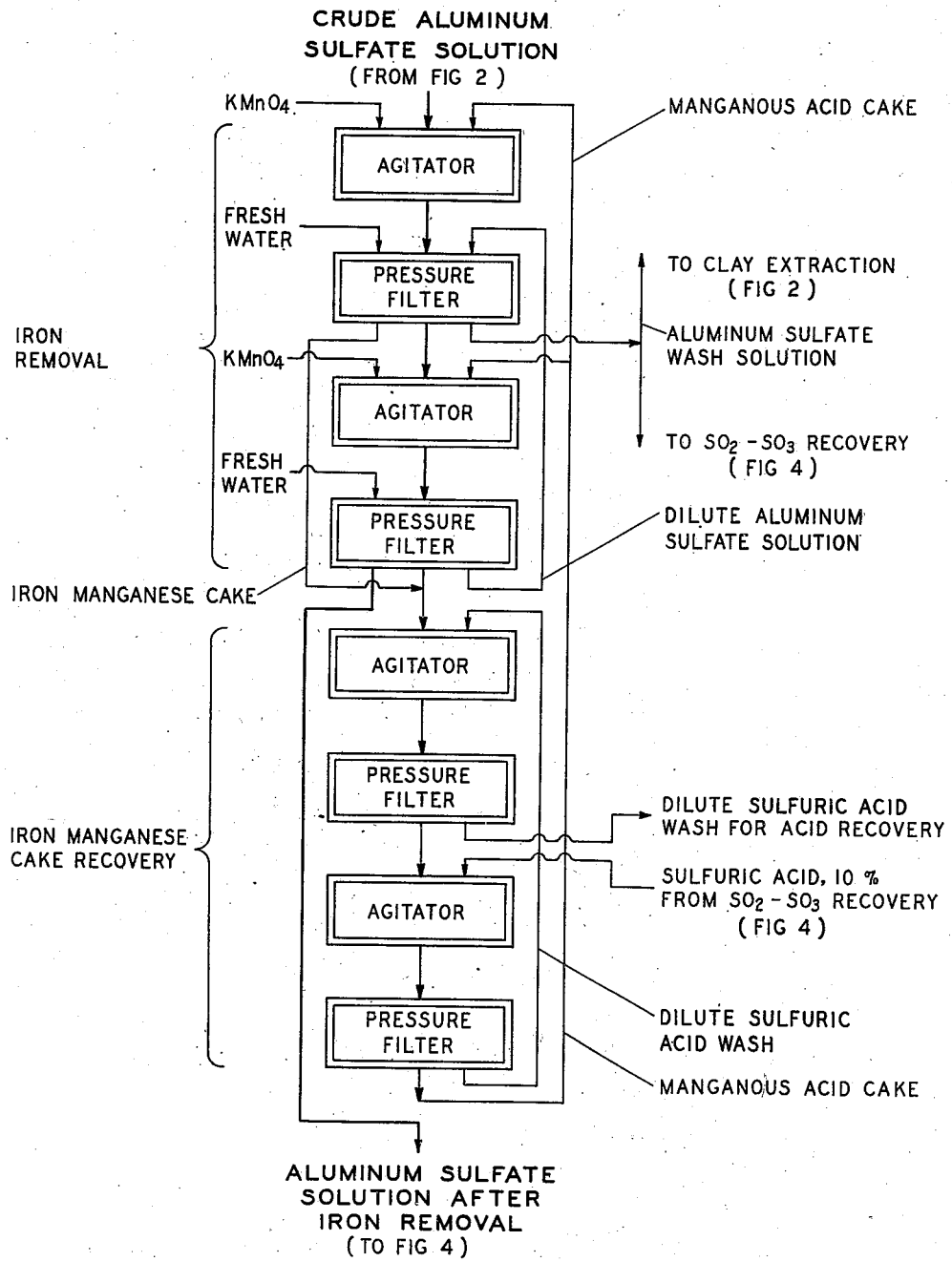
Fig. 3 is a flow sheet showing the details for the separation of iron from said impure aluminum sulfate solution with manganous acid with the consequent production of an iron manganese complex and the regeneration of manganous acid from said complex, as outlined in Fig. 1.

The operations outlined in Fig. 1 and detailed in Figs. 2 to 4, inclusive, are described and illustrated by examples covering each successive group of operations. The operation of cyclic processes as a whole may thus be more adequately described in view of the fact that as a practical matter it is generally necessary to provide adequate storage facilities for the raw materials and products for each group of operations to properly care for flexibility of manipulation and maintenance of equipment involved in a unit of such a group of operations.

*Example 1.—Clay preparation (Fig. 2)*

Forty tons of raw clay, containing 37.6% $Al_2O_3$, 43.3% $SiO_2$, 1.0% $Fe_2O_3$, 2.6% $TiO_2$, 0.13% $Na_2O$, 0.11% $K_2O$, 0.38% $CaO$, 0.20% $MgO$, and with ignition loss of 14.5%, was fed into a rotary kiln at the rate of 250 pounds per hour. The kiln, 24 feet in length and 20 inches inside diameter, was operated at a speed of 3/4 R. P. M. with the highest temperature at the end of the kiln adjacent to the discharge end thereof maintained at approximately 860° C. and the exhaust temperature adjacent to the feed end of the kiln was approximately 555° C. The exhaust gas was passed through a dust separator, and the dust separated and collected therein delivered along with the raw charge to the feed end of the kiln. The clay so dehydrated was cooled and comminuted in a hammer mill, and the resulting ground calcined clay had a screen analysis of +35 mesh, 2.2%; −35+60 mesh, 26.1%; −60+150 mesh, 30.3%; −150 mesh, 41.4%, and a chemical analysis of the more important components of 44% $Al_2O_3$, 50.6% $SiO_2$ and 1.2% $Fe_2O_3$.

*Example 2.—Clay extraction (Fig. 2)*

Over a period of twenty-nine days, dehydrated clay produced in accordance with Example 1 was fed in a stream to a continuous mixer at a rate of 1.07 tons per day, together with sulfuric acid containing 30 per cent by weight of $H_2SO_4$ at a rate of 3.95 tons per day. The sulfuric acid so used was derived in part by recovery of oxides of sulfur as dilute sulfuric acid containing a small portion of aluminum sulfate and manganous sulfate, as illustrated in Example 8 below, together with the amount of concentrated sulfuric acid required to make up losses normally occurring in the entire cyclic process herein described. The resulting acid-clay slurry passed continuously through a series of three reaction tanks equipped with agitators wherein the temperature of the reactants was maintained at approximately 100° C. for a total of 5.3 hours. The substantially completely reacted mixture passed to a storage tank maintained at approximately 77° C. wherein the material was retained on the average of approximately 2.8 hours. The acid-clay slurry containing 15 per cent insoluble siliceous material was filtered through a recess plate filter, and the insoluble residue collected therein periodically washed successively with dilute aluminum sulfate wash solution produced by the washing of iron-manganese cake (Example 4 below) and fresh water, and the washed residue discharged therefrom. The impure aluminum sulfate solution derived from the filtrate containing 30 to 31 per cent $Al_2(SO_4)_3$ and the washings containing 13 to 14 per cent $Al_2(SO_4)_3$ contained in each hundred ml. 25.7 g. $Al_2(SO_4)_3$, 0.0022 g. $SiO_2$, and 0.0947 g. $Fe_2O_3$.

*Example 3.—Iron removal (Fig. 3)*

The impure aluminum sulfate solution produced in accordance with Example 2 above was treated in two stages to separate the iron therefrom. In the first stage, successive charges of 200 gallons of the impure aluminum sulfate solution were charged to an agitator and treated with 190 grams of potassium permanganate, 50 pounds of regenerated manganous acid cake produced in accordance with Example 4 below, and 100 grams of potassium permanganate, the amount of the potassium permanganate being that required to oxidize the oxidizable constituents of the impure aluminum sulfate solution and to convert the manganese sulfate therein to fresh manganous acid. The iron-manganese complex precipitated therein after maintaining the temperature of the mixture at approximately 70° C. for a period of approximately 1½ hours was separated in a pressure filter in the form of a cake which was first washed successively with a dilute aluminum sulfate solution produced by washing the iron-manganese cake as processed in the second stage with fresh water, and then with fresh water. The resulting more dilute aluminum sulfate solution from the washing operations was employed in part to wash the siliceous residue separated in the clay extraction (Example 2 above) and in part in connection with the subsequent recovery of oxides of sulfur (Example 8 below). Successive charges of 200 gallons of partially purified aluminum sulfate solution were then treated with 25 pounds of regenerated manganous acid cake and finally with 50 g. potassium permanganate. The iron-manganese complex produced as a result of the treatment at a temperature of approximately 50° C. and a retention time of ten hours was then separated in a pressure filter from the purified aluminum sulfate solution as a cake. The iron-manganese cake was then washed with fresh water to remove aluminum sulfate retained therein and thereby provide the dilute aluminum sulfate solution used for washing the cake produced in the first stage of the iron removal treatment and to leave the cake in proper condition for regeneration of manganous acid therefrom. The aluminum sulfate solution so purified contained 0.0032 g. Fe₂O₃ per hundred ml.

Example 4.—Iron-manganese cake recovery (Fig. 3) (manganous acid regeneration)

In the first stage of this regeneration the iron-manganese cake produced in Example 3 above was charged in successive 200-pound portions to an agitator with 700 pounds of dilute sulfuric acid derived from washing the cake in the second stage of the operation with dilute sulfuric acid containing 10 per cent $H_2SO_4$. After a time of contact of twelve hours, the mixture was filtered and the filter cake washed successively with the 10 per cent sulfuric acid produced in accordance with Example 8 and fresh water to produce the regenerated manganous acid cake and the dilute sulfuric acid wash which was used in the first stage of the regeneration. The iron-manganese cake contained 22.73% $MnO_2$, 5.37% $Fe_2O_3$, and 2.38% $Al_2O_3$, and the manganous acid recovered therefrom contained 24.28% $MnO_2$, 3.46% $Fe_2O_3$, and 0.75% $Al_2O_3$.

Example 5.—Dehydrating aluminum sulfate solution (Fig. 4)

The purified aluminum sulfate solution produced in Example 3 above was charged at the rate of 36 gallons per hour to the first of a series of two submerged combustion evaporators wherein the concentration of aluminum sulfate was increased to 55.7% and discharged therefrom to a drum flaker which delivered the crystalline sulfate in a sheet-like mass. This flaked sulfate was charged to a rotary dehydrating kiln at a rate of 200 pounds per hour and a maximum temperature therein of 760° C. Exhaust gas from the dehydrating kiln passed through a dust separator, and the dust separated therein delivered to the concentrated sulfate fed to the drum flaker. The aluminum sulfate so dehydrated contained 82.3% $Al_2(SO_4)_3$ which corresponds approximately to 3 mols of water per each mol of aluminum sulfate.

Example 6.—Desulfurizing aluminum sulfate (Fig. 4)

The dehydrated aluminum sulfate produced in Example 5 above was charged at the rate of 200 pounds per hour to a rotary desulfurizing kiln wherein the maximum temperature was maintained at approximately 1150° C. The exhaust gas from the desulfurizing kiln was passed through a dust separator, dust separated therefrom delivered to the drum flaker, and the gas from the separator containing oxides of sulfur delivered to the $SO_2$-$SO_3$ recovery operation described in Example 8 below. The alumina discharged from the desulfurizing contained 0.07% $Fe_2O_3$ and 0.15% $SiO_2$.

Example 7.—Finishing alumina (Fig. 4)

The alumina produced by desulfurization of aluminum sulfate in Example 6 above was cooled and reduced to appropriate size in the conventional manner.

Example 8.—Recovery of oxides of sulfur (Fig. 4)

The exhaust gases from the desulfurizing kiln (Example 6 above), after separation of dust therefrom, were passed through an electrostatic precipitator wherein sulfuric acid containing 75 per cent by weight of $H_2SO_4$ was separated. The gas from the electrostatic precipitator was passed through an absorber in contact with the more dilute aluminum sulfate solution, derived from the regeneration of the iron-manganese cake in Example 4 above and in the presence of manganese sulfate. The solution in the absorber contained 4080 gallons of water, 290 pounds of $Al_2(SO_4)_3$, and 40 pounds of $MnSO_4$. The sulfuric acid produced in the absorber contained per each 100 ml. 32.8 g. $H_2SO_4$, (28% by weight of $H_2SO_4$), 0.0021 g. Fe, 0.106 g. Al, 0.048 g. Mn. Although the fundamental procedure of recovery of oxides of sulfur is shown in the present example, the preferred procedure is illustrated in Fig. 4, wherein a portion of the purified aluminum sulfate solution free from iron (from Example 3) is contacted first with the gases carrying oxides of sulfur (from Example 6) in a hydrator and returned to the stream of purified aluminum sulfate solution delivered to the submerged combustion evaporators (Example 5). Thereafter, the gases carrying the remaining oxides of sulfur is passed to an electrostatic precipitator wherein a concentrated sulfuric acid is separated. Thereafter, a portion of the gas carrying the remainder of the oxides of sulfur is passed through one absorber to produce the dilute sulfuric acid required for the regeneration of the iron-manganese cake (Example 4), and the remainder through another absorber wherein the oxides of sulfur are recovered in a higher concentration, the acid of a higher concentration produced therein being combined with the more concentrated acid produced in the electrostatic precipitator to supply at least a part of the acid requirement of the clay extraction in Example 2.

The present invention is directed to the production of alumina from widely distributed siliceous aluminiferous material which are generally considered to be unsatisfactory as a raw material insofar as present commercial manufacturing operations are concerned. The naturally occurring material with a relatively high water content is dried to remove the free water and then calcined to render the material more adaptable to extraction of the alumina therefrom. This calcination is carried on to a degree which is believed to correspond substantially to that required for the dehydration of the water of constitution of the naturally occurring aluminiferous material. A stream of the fine dehydrated aluminiferous material is mixed with a stream of sulfuric acid, a portion of which is derived from a subsequent step in the operation of the process and which generally not only contains a small proportion of aluminum sulfate but also a small proportion of manganese sulfate. The extraction is begun at a temperature of the order of 100° C. and is carried on continuously with the temperature at the latter stage of extraction not substantially lower than 70° C. The concentration of sulfuric acid used is of the order of 25 to 30% by weight of $H_2SO_4$, and under the conditions of continuous extraction, substantially all of the alumina is dissolved in the raw material with the production of a mixture of the aluminum sulfate solution and the insoluble siliceous residue. This solution is separated from the siliceous residue by operations which include the washing of the latter with a quite dilute aluminum sulfate solution dried elsewhere in the operation of the process and finally with a fresh water.

Iron is the principal impurity present in the impure aluminum sulfate solution derived from the extraction steps, but the iron present is at least in part in the ferrous state, although all methods for the precipitation of iron from such a solution require its oxidation to the ferric state. In the present process the ferric iron is removed by precipitation from the solution in part with freshly generated manganous acid and in part by regenerated manganous acid derived during the operation of the process. The freshly generated manganous acid may be derived in part from the manganese sulfate carried by the sulfuric acid used in extraction or from manganese sulfate added directly to the impure aluminum sulfate solution. The oxidation of the ferrous iron to ferric iron and the oxidation of the manganese sulfate to manganous acid is accomplished by the introduction of the required amount of potassium permanganate, preferably stepwise, to obtain the most effective utilization of the potassium permanganate and the resultant production of generated manganous acid and precipitated iron manganese cake produced therefrom. This precipitation of the iron with manganous acid appears to be effected most readily when the reactants are maintained at a temperature of the order of 70° C. The aluminum sulfate solution so purified is of sufficiently high purity to be converted directly to alumina suitable for the electrolytic production of alumina.

The purified aluminum sulfate solution is dehydrated, desulfurized, and the resulting alumina finished by conventional cooling and sizing procedure.

The iron manganese cake containing the iron which has been removed in the course of the preparation of the purified aluminum sulfate solution is treated to regenerate manganous acid therefrom by stepwise procedure, which is in effect a countercurrent treatment with dilute sulfuric acid, containing approximately 10% by weight of $H_2SO_4$, and fresh water, respectively, whereby the iron content of the cake is substantially reduced though not entirely eliminated and the regenerated manganous acid made available for treatment of subsequent portions of the impure aluminum sulfate solution. The dilute sulfuric acid solution used in the regeneration is preferably derived from the sulfuric acid produced on recovery of oxides of sulfur described below.

The desulfurization of the aluminum sulfate produces a mixture of oxides of sulfur which are recovered and form a substantial proportion of the sulfuric acid required in the extraction steps. A further quantity of sulfuric acid required to make up losses in the cyclic operation and to provide a sufficient quantity of sulfuric acid for further extraction of clay may be derived from sulfur supplied to the desulphurizing kiln, after which the sulfur dioxide is recovered along with that obtained by the decomposition of aluminum sulfate. The following procedure has been found to be particularly effective in this recovery. The hot oxides of sulfur from the desulfurization operation are contacted with a portion of the purified aluminum sulfate solution, thereby absorbing some of the oxides and evaporating a portion of the water from said solution. The solution so treated is returned to the stream of the purified aluminum sulfate solution for dehydration. The gaseous mixture carrying the remaining oxides of sulfur is then passed through an electrostatic precipitator wherein concentrated sulfuric acid is separated and thereafter in the presence of the customary amount of oxygen supplied by admixed air passed in contact with an absorbent solution containing small proportion of aluminum sulfate and in the presence of manganese sulfate in amount of the order equivalent to 0.04 gram of manganese ions per 100 ml. of solution. The sulfur dioxide may be oxidized in the presence of the catalyst by known methods such as that disclosed in Patent No. 2,188,324. The solution containing the small proportion of aluminum sulfate is derived at least in part from the washing of the iron manganese cake produced with fresh water during the iron removal operation. The absorption operation for removal of oxides of sulfur after the electrical precipitation proportion thereof may be carried out in either parallel or series. The latest procedure is preferable, for in the first step of the absorption, acid containing the order of 20 to 30% by weight of $H_2SO_4$ is produced, such acid when mixed with the acid from the electrostatic precipitator being of proper concentration for the extraction of aluminiferous material, while the more dilute acid produced in the final stage of recovery contains of the order of 10% by weight of $H_2SO_4$ and is suitable for the regeneration of manganous acid from the iron manganese cake.

It will be seen from the above description that the entire process for the production of alumina consists essentially of several cooperative cyclic operations which have been discovered to be necessary in order that alumina may be effectively and efficiently produced from relatively low-grade raw material. The principal cycles include the use of the dilute aluminum sulfate solution obtained from washing the iron manganese complex in the recovery of the oxides of sulfur, the use of a portion of dilute sulfuric acid used in the regeneration of the iron manganese complex, and the use of a purified aluminum sulfate solution in the recovery of oxides of sulfur and the use of manganese sulfate not only as a catalyst along with aluminum sulfate in the recovery of oxides of sulfur but also its use in the aluminum sulfate solution resulting from the reaction of the sulfuric acid derived therefrom as a source of a portion of the manganous acid required for iron removal.

Semi-plant scale operations involving the process of the present invention and carried out substantially in accordance with the examples presented above has resulted in the production, to date, of approximately 100 tons of alumina.

It will be seen, therefore, that this invention actually may be carried out by the use of various modifications and changes without departing from its spirit and scope.

I claim:

1. A cyclic process for the production of alumina from siliceous aluminiferous material which comprises (a) intimately mixing a stream of dehydrated siliceous aluminiferous material and a stream of aqueous sulfuric acid derived at least in part from operation (g) of the process defined herein, and containing a small proportion of aluminum sulfate, at a temperature and for a time sufficient to extract substantially all of the aluminum from said material and form a mixture of the dissolved aluminum sulfate substantially free from dissolved silica and a siliceous residue, (b) separating the impure aluminum sulfate solution so formed from said siliceous residue, (c) adding to said impure aluminum sulfate solution a sufficient quantity of manganous acid to precipitate the iron therein as an iron-manganese complex, (d) separating the aluminum sulfate solution so purified from said iron-manganese complex, (e) washing said iron-manganese complex with water to produce a more dilute aqueous solution of aluminum sulfate substantially free from iron, (f) dehydrating and desulfurizing said purified aluminum sulfate solution to produce alumina and oxides of sulfur, and (g) oxidizing and absorbing said oxides of sulfur in said more dilute aluminum sulfate solution produced in operation (e) of the process defined herein to produce sulfuric acid containing a small proportion of aluminum sulfate.

2. A cyclic process for the production of alumina from siliceous aluminiferous material which comprises (a) intimately mixing a stream of dehydrated siliceous aluminiferous material and a stream of aqueous sulfuric acid, derived at least in part from operation (g) of the process defined herein, and containing small proportions of aluminum sulfate and manganese sulfate at a temperature and for a time sufficient to extract substantially all of the aluminum from said material and form a mixture of dissolved aluminum sulfate substantially free from dissolved silica and a siliceous residue, (b) separating the impure aluminum sulfate solution so formed from said siliceous residue, (c) adding to said impure aluminum sulfate solution a sufficient quantity of an oxidizing agent to form manganous acid from the manganese sulfate therein and therewith precipitate the iron therein as iron-manganese complex, (d) separating the aluminum sulfate solution so purified from said iron-manganese complex, (e) washing said iron-manganese complex with water to produce a more dilute aqueous solution of aluminum sulfate substantially free from iron, (f) dehydrating and desulfurizing said purified aluminum sulfate solution to produce alumina and oxides of sulfur, and (g) oxidizing and absorbing said oxides of sulfur in said more dilute aluminum sulfate solution produced in operation (e) of the process defined herein in the presence of a small proportion of manganese sulfate to produce sulfuric acid containing small proportions of aluminum sulfate and manganese sulfate.

3. A cyclic process for the production of alumina from siliceous aluminiferous material which comprises (a) intimately mixing a stream of dehydrated siliceous aluminiferous material and a stream of aqueous sulfuric acid derived at least in part from operation (g) of the process defined herein and containing a small proportion of aluminum sulfate at a temperature and for a time sufficient to extract substantially all of the aluminum from said material and form a mixture of dissolved aluminum sulfate substantially free from dissolved silica and a siliceous residue, (b) separating the impure aluminum sulfate solution so formed from said siliceous residue, (c) adding to said impure aluminum sulfate solution a sufficient quantity of manganous acid derived at least in part from operation (h) of the process defined herein to precipitate the iron therein as an iron-manganese complex, (d) separating the aluminum sulfate solution so purified from said iron-manganese complex, (e) washing said iron-manganese complex with water to produce a more dilute aqueous solution of aluminum sulfate substantially free from iron, (f) dehydrating and desulfurizing said purified aluminum sulfate solution to produce alumina and oxides of sulfur, (g) oxidizing and absorbing said oxides of sulfur in said more dilute aluminum sulfate solution produced in operation (e) of the process defined herein to produce sulfuric acid containing a small proportion of aluminum sulfate, and (h) treating said iron-manganese complex with acid derived at least in part from the oxides of sulfur produced in operation (f) of the process defined herein to remove iron therefrom and regenerate manganous acid.

4. A cyclic process for the production of alumina from siliceous aluminiferous material which comprises (a) intimately mixing a stream of dehydrated siliceous aluminiferous material and a stream of aqueous sulfuric acid, derived at least in part from operation (i) of the process defined herein, and containing a small proportion of aluminum sulfate at a temperature and for a time sufficient to extract substantially all of the aluminum from said material and form a mixture of dissolved aluminum sulfate substantially free from dissolved silica and a siliceous residue, (b) separating the impure aluminum sulfate solution so formed from said siliceous residue, (c) contacting said impure aluminum sulfate solution with a sufficient quantity of manganous acid to precipitate the iron therein as an iron-manganese complex, (d) separating the aluminum sulfate solution so purified from said iron-manganese complex, (e) washing said iron-manganese complex with water to produce a more dilute aqueous solution of aluminum sulfate substantially free from iron, (f) dehydrating and desulfurizing a portion of said purified aluminum sulfate solution to produce alumina and oxides of sulfur, (g) contacting said oxides of sulfur with another portion of said purified aluminum sulfate solution to evaporate water therefrom and absorb at least some of the oxides of sulfur therein, (h) returning the resulting solution after such contact to the supply of purified aluminum sulfate solution for dehydration and desulfurization, and (i) oxidizing and absorbing a substantial portion of the remainder of said oxides of sulfur in said more dilute aluminum sulfate solution produced in operation (e) of the process defined herein to produce sulfuric acid containing a small proportion of aluminum sulfate.

5. A cyclic process for the production of alumina from siliceous aluminiferous material which comprises (a) intimately mixing a stream of dehydrated siliceous aluminiferous material and a stream of aqueous sulfuric acid derived at least in part from operation (i) of the process defined herein, and containing small proportions of aluminum sulfate and manganese sulfate at a temperature and for a time sufficient to extract substantially all of the aluminum from said material and form a mixture of dissolved aluminum sulfate substantially free from dissolved silica and a siliceous residue, (b) separating the dissolved aluminum sulfate and washing the siliceous residue substantially free therefrom to produce an impure aluminum sulfate solution, (c) contacting said impure aluminum sulfate solution with manganese acid derived in part from the manganese sulfate therein and derived in part from operation (j) of the process defined herein and therewith precipitating the iron therein as iron-managanese complex, (d) separating the aluminum sulfate solution so purified from said iron-manganese complex, (e) washing said iron-manganese complex with water to produce a more dilute aqueous solution of aluminum sulfate substantially free from iron, (f) dehydrating and desulfurizing a portion of said purified aluminum sulfate solution to produce alumina and oxides of sulfur, (g) contacting said oxides of sulfur with another portion of said purified aluminum sulfate solution to evaporate water therefrom and absorb at least some of the oxides of sulfur therein, (h) returning the resulting solution after such contact to the supply of purified aluminum sulfate solution for dehydration and desulfurization, (i) oxidizing and absorbing a substantial portion of the remainder of said oxides of sulfur in said more dilute aluminum sulfate solution produced in operation (e) of the process defined herein in the presence of a small proportion of manganese sulfate to produce sulfuric acid containing a small proportion of aluminum sulfate and manganese sulfate, and (j) treating said iron-manganese complex with a portion of sulfuric acid so produced to remove iron therefrom and regenerate manganous acid.

JOHN H. WALTHALL.